United States Patent
Park et al.

(10) Patent No.: US 7,443,881 B2
(45) Date of Patent: *Oct. 28, 2008

(54) METHOD AND APPARATUS FOR INTERFACING SYNCHRONOUS CORE NETWORK WITH ASYNCHRONOUS RADIO NETWORK

(75) Inventors: Jae-Hong Park, Ichon-shi (KR);
Woon-Hee Hwang, Ichon-shi (KR);
Yeon-Sang Koo, Ichon-shi (KR);
Chong-Won Lee, Ichon-shi (KR);
Shin-Hyun Yang, Ichon-shi (KR);
Jeong-Hwa Ye, Ichon-shi (KR)

(73) Assignee: UTStarcom Korea Limited (c/o UTStarcom, Inc.), Alameda, CA (US)

( * ) Notice: Subject to any disclaimer, the term of this patent is extended or adjusted under 35 U.S.C. 154(b) by 535 days.

This patent is subject to a terminal disclaimer.

(21) Appl. No.: 11/022,497

(22) Filed: Dec. 22, 2004

(65) Prior Publication Data

US 2005/0239484 A1   Oct. 27, 2005

Related U.S. Application Data

(62) Division of application No. 09/628,316, filed on Jul. 28, 2000, now Pat. No. 6,853,852.

(30) Foreign Application Priority Data

| Jul. 28, 1999 | (KR) | ............................... 1999-30927 |
| Jul. 28, 1999 | (KR) | ............................... 1999-30928 |
| Aug. 27, 1999 | (KR) | ............................... 1999-35876 |
| Sep. 17, 1999 | (KR) | ............................... 1999-40165 |

(51) Int. Cl.
*H04L 12/56* (2006.01)
*H04J 3/16* (2006.01)
*H04B 1/38* (2006.01)
*H04Q 7/20* (2006.01)

(52) U.S. Cl. .................. 370/466; 370/336; 370/352; 370/420; 370/461; 370/469; 455/436; 455/420; 455/450; 455/509; 455/561

(58) Field of Classification Search ......... 370/352–356, 370/420–469, 336; 455/509, 452.2, 420, 455/436, 450, 561
See application file for complete search history.

(56) References Cited

U.S. PATENT DOCUMENTS 5,586,273 A  *  12/1996  Blair et al. ................ 710/105
(Continued)

FOREIGN PATENT DOCUMENTS

| WO | WO 98/10607 | 3/1998 |
| WO | WO 99/53668 A2 | 10/1999 |
| WO | WO 99/53668 A3 | 10/1999 |

OTHER PUBLICATIONS

Communication pursuant to Article 96(2) EPC, for related European Patent Application No. 00 306 450.8-1249, European Patent Office, Jan. 11, 2006.

* cited by examiner

*Primary Examiner*—Edan Orgad
*Assistant Examiner*—Venkatesh Haliyur

(57) ABSTRACT

A method and apparatus for interfacing a synchronous core network with an asynchronous radio network in a next-generation mobile telecommunications system is disclosed. The method for mapping a message in order to interface a synchronous core network with an asynchronous radio network, the radio network having a base station (BS), the base station having a radio resource controller, a radio link controller, a medium access controller and a physical controller, the method comprising the steps of: a) selecting a function necessary to map a synchronous message to an asynchronous message; b) determining whether the synchronous message is to be transmitted to the mobile station or not; c) storing information necessary to map the synchronous message to the asynchronous message if the synchronous message is to transmitted to the mobile station, d) mapping parameters in the synchronous message to those in the asynchronous message, thereby generating the asynchronous message; e) discarding the message not to be transmitted to the mobile station after storing parameters included in the message not to be transmitted onto a predetermined device; and f) transmitting the asynchronous message to the radio resource controller.

12 Claims, 14 Drawing Sheets

U.S. PATENT DOCUMENTS

| | | | |
|---|---|---|---|
| 5,600,633 A | 2/1997 | Jaisingh et al. | 370/277 |
| 5,666,362 A * | 9/1997 | Chen et al. | 370/420 |
| 5,768,686 A * | 6/1998 | LeBlanc et al. | 340/7.25 |
| 5,890,064 A * | 3/1999 | Widergen et al. | 455/445 |
| 5,907,542 A * | 5/1999 | Kuehnel et al. | 370/331 |
| 6,018,521 A | 1/2000 | Timbs et al. | 370/342 |
| 6,034,950 A * | 3/2000 | Sauer et al. | 370/310.2 |
| 6,081,534 A * | 6/2000 | Sipila | 370/466 |
| 6,181,947 B1 * | 1/2001 | Du et al. | 455/509 |
| 6,233,465 B1 | 5/2001 | Smith et al. | 455/560 |
| 6,374,112 B1 * | 4/2002 | Widegren et al. | 455/452.2 |
| 6,396,820 B1 * | 5/2002 | Dolan et al. | 370/328 |
| 6,490,451 B1 * | 12/2002 | Denman et al. | 455/436 |
| 6,539,237 B1 * | 3/2003 | Sayers et al. | 455/555 |
| 6,570,869 B1 * | 5/2003 | Shankar et al. | 370/352 |
| 6,729,929 B1 * | 5/2004 | Sayers et al. | 455/446 |
| 6,853,852 B1 * | 2/2005 | Park et al. | 455/561 |

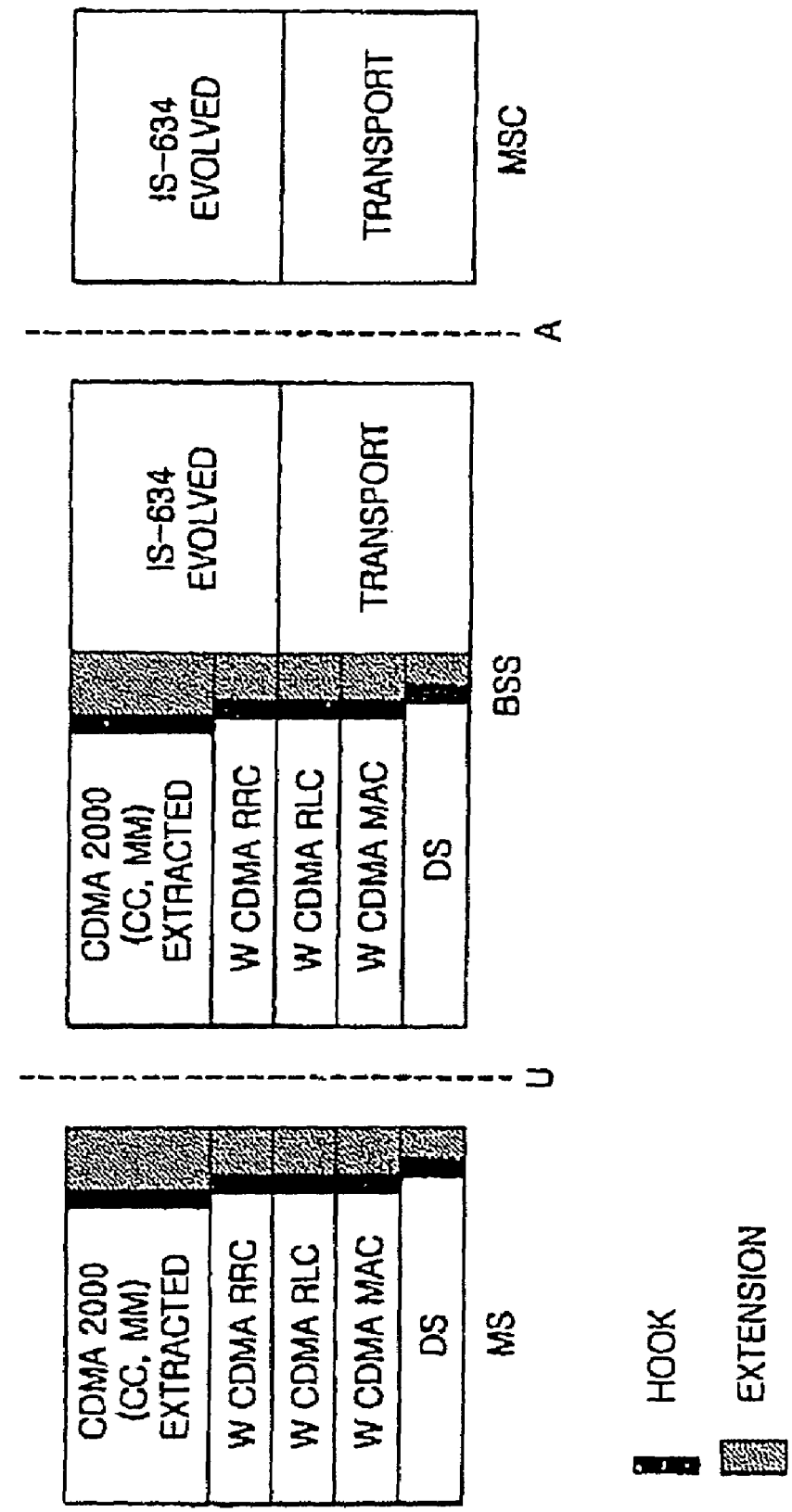

METHOD AND APPARATUS FOR INTERFACING SYNCHRONOUS CORE NETWORK WITH ASYNCHRONOUS RADIO NETWORK

REFERENCE TO RELATED APPLICATIONS

This application is a divisional application of and claims priority to co-pending U.S. patent application Ser. No. 09/628,316, filed Jul. 28, 2000, which is incorporated herein by reference. This application also claims priority, based on 35 U.S.C. §119, to (i) Korean Patent Application No. 1999-30927, filed on Jul. 28, 1999, (ii) Korean Patent Application No. 1999-30928, filed on Jul. 28, 1999, (iii) Korean Patent Application No. 1999-35876, filed on Aug. 27, 1999, and (iv) Korean Patent Application No. 1999-40165, filed on Sep. 17, 1999, which are incorporated herein by reference.

FIELD OF THE INVENTION

The present invention relates to a method and apparatus for interfacing a synchronous core network with an asynchronous radio network; and, more particularly to a method and apparatus for interfacing a synchronous core network with an asynchronous radio network in a next-generation mobile telecommunications system.

DESCRIPTION OF THE PRIOR ART

In a conventional synchronous mobile telecommunication system, a synchronous mobile station is connected to a synchronous radio network (for example, a CDMA-2000 radio network), and an ANSI-41 network is connected to a core network.

In a conventional asynchronous mobile telecommunication system, an asynchronous mobile station is connected to an asynchronous radio network (for example, a UMTS (universal mobile telecommunications system) Terrestrial Radio Access Network (UTRAN)), and a global system for mobile communications-mobile application part (GSM-MAP) network is connected to a core network.

FIG. 1 shows core network interface architectures of the conventional synchronous/asynchronous mobile telecommunication systems as mentioned above.

FIG. 1A is a view showing the core network interface architecture of the conventional synchronous mobile telecommunications system. In this drawing, the reference numeral 110 denotes a synchronous mobile station, 120 denotes a synchronous radio network (e.g., a code division multiple access-2000 (CDMA-2000) radio network) which performs a data interfacing operation with the synchronous mobile station 110 and includes a synchronous base transceiver station/base station controller(BTS/BSC), and 130 denotes a synchronous core network which is connected to the synchronous radio network 120 and includes a synchronous mobile services switching center (MSC) 131 and an ANSI-41 network 133.

In the above core network interface architecture of the conventional synchronous mobile telecommunication system, the synchronous mobile station 110 can be connected to only the synchronous radio network 120 as well known to one skilled in the art, which is in turn connected to the synchronous core network 130, thereby allowing the synchronous mobile station 110 to be interfaced with only the synchronous core network 130.

FIG. 1B is a view showing the core network interface architecture of the conventional asynchronous mobile telecommunication system. In this drawing, the reference numeral 140 denotes an asynchronous mobile station, 150 denotes an asynchronous radio network (i.e., a UTRAN) which includes a base transceiver station (BTS) and a radio network controller (RNC), and 160 denotes an asynchronous core network which includes an asynchronous mobile services switching center (MSC) 161 connected to the asynchronous radio network 150 and a GMS-MAP network 163 connection to the asynchronous MSC 161.

In the above core network interface architecture of the conventional asynchronous mobile telecommunications system, the asynchronous mobile station 140 is connected to the asynchronous radio network 150 (e.g., UTRAN) which is in turn connected to the asynchronous core network 160, thereby allowing the asynchronous mobile station 140 to perform a data interfacing operation with the asynchronous core network 160.

FIG. 2 shows layer protocol structures of the conventional mobile telecommunication systems as mentioned above.

FIG. 2A is a view showing the layered protocol structure of the conventional synchronous mobile telecommunications system. In this drawing, the reference numeral 110 denotes a synchronous mobile station, 120 a synchronous radio network and 50 a synchronous core network connected to the synchronous radio network 130.

The synchronous mobile station 110 comprises a layer 3 111, a layer 2 114 and a layer 1 115. The layer 3 111 includes a synchronous call control (CC) entity 113 for a call management and a synchronous mobility management (MM) entity 112 for a mobility management.

The layer 1 115 is a physical layer which offers data transport services to higher layers and transfers transport blocks over a radio interface.

The layer 2 114 is a data link layer which includes the following sub layers, a medium access control (MAC) sub layer and a radio link control (RLC) sub layer. However, the sub layers are not shown in this drawing.

The MAC sub layer offers data transfer services on logical channels to a higher layer, the RLC sub layer, and on transport channels to a lower layer, the physical layer 36. The MAC sub layer is responsible for mapping of the logical channel onto the appropriate transports channel.

The RLC sub layer offers data transfer services on primitive to a higher layer and on logical channels to a lower layer, MAC sub layer. Also, the RLC sub layer performs an error correction, a duplicate detection, a ciphering and a flow control of the data.

The layer 3 114 is a network layer which includes the following sub layers, a synchronous radio resource (RR) sub layer, a synchronous call control (CC) entity 113 and a mobility management (MM) entity 112. In synchronous system, the synchronous RR sub layer is not apparently separated from the others in the layer 3 111.

The RR sub layer offers data transfer services on primitive to a lower layer, RLC sub layer, and handles a control plane signaling of the layer 3 111 between a mobile station and a synchronous radio network. The RR sub layer manages a radio resource. Also, the RR sub layer assigns/re-configures/releases the radio resource to the mobile station/radio network.

The CC entity 113 handles a call control signaling of layer 3 between the mobile stations and the synchronous radio network.

The MM entity 112 handles a mobility management signaling of layer 3 between the mobile stations and the synchronous radio network.

The layers 3 to 1 111, 114 and 115 in the synchronous mobile station 110 communicate with corresponding layers 121, 122 and 123 in the synchronous radio network 120.

The synchronous radio network 120 comprises a layer 3 121, a layer 2 122 and a layer 1 123. The layers 3 to 1 121, 122 and 123 in the synchronous radio network 120 correspond respectively to those in the synchronous mobile station 110.

The layers 3 to 1, 121, 122 and 123 in the synchronous radio network 120 communicate with corresponding layers in the synchronous mobile station 110 and the synchronous core network 130.

The synchronous core network 130 comprises a layer 3 131,m a layer 2 134 and a layer 1 135. The layers 3 to 1 in the synchronous radio network 130 correspond respectively to those in the synchronous radio network 120.

The layers 3 to 1 131, 134 and 135 in the synchronous core network 130 communicate with corresponding layers 121, 122 and 123 in the synchronous radio network 120.

In the conventional synchronous mobile station and radio network as the layered protocol structure, the synchronous mobile station 110 receives a Sync channel message from the synchronous radio network 120 over a Synch channel and acquires information necessary to its connection to the synchronous core network 130, including information related to the synchronous core network 130 and information about the synchronous radio network 120, from the received Sync channel message.

In other words, for interfacing with the synchronous ANSI-41 network via the synchronous radio network, the synchronous mobile station acquires system information (i.e., information related to the radio network and core network) after it is powered on.

Information elements are written in the Sync channel message received by the synchronous mobile station, as follows:
a) Protocol Revision Level: 8 bits,
b) Minimum Protocol Revision Level: 8 bits,
c) System Identification: 15 bits,
d) Network Identification: 16 bits,
e) Pilot Pseudo Noise (PN) sequence offset index: 9 bits,
f) Long Code State: 42 bits,
g) System Time: 36 bits,
h) The number of Leap seconds that have occurred since the start of System Time: 8 bits,
i) Offset of local time from System Time: 6 bits,
j) Daylight savings time indicator: 1 bit,
k) Paging Channel data Rate: 2 bits,
l) Frequency assignment: 11 bits,
m) Extended frequency assignment: 11 bits, and
n) Orthogonal transmit diversity mode: 2 bits.

The synchronous mobile station stores the following information elements from the received Sync channel message in its memory:
a) Protocol Revision Level: 8 bits,
b) Minimum Protocol Revision Level: 8 bits,
c) System Identification: 15 bits,
d) Network Identification: 16 bits,
e) Pilot PN sequence offset index: 9 bits,
f) Long Code State: 42 bits,
g) System Time: 36 bits,
h) Paging Channel Data Rate: 2 bits, and
i) Orthogonal transmit diversity mode: 2 bits.

FIG. 2B is a view showing the layered protocol structure of the conventional asynchronous mobile telecommunications system. In this drawing, the reference numeral 140 denotes an asynchronous mobile station, 150 an asynchronous radio network (e.g., UTRAN) and 160 an asynchronous core network.

The asynchronous mobile station 140 comprises a non-access stratum (NAS) part, a layer 3 144, a layer 2 145, and a layer 1 146. In particular, the layer 3 144 includes an access stratum (AS) part. The NAS part includes an asynchronous call control (CC) entity 143 for management of a call and an asynchronous mobility management (MM) entity 142 for management of a mobility. The AS part includes an asynchronous radio resource control (RRC) block. In the asynchronous system, the asynchronous RRC sub layer is apparently separated from the NAS part. Functions of the asynchronous RRC sub layer are the same as those of the synchronous RR sub layer.

The asynchronous radio network 150 comprises a layer 3 151, a layer 2 152, and a layer 1 153. The layer 3 151 of the asynchronous radio network 150 has no NAS part having an asynchronous CC entity and an asynchronous MM entity. The layers 3 to 1 of the asynchronous radio network 150 are connected and correspond respectively to those in the asynchronous mobile station 140 and those in the asynchronous core network 160. However, since the asynchronous radio network 150 does not have the NAS part, i.e., the asynchronous CC entity and the asynchronous MM entity, the NAS parts of the asynchronous mobile station 140 and asynchronous core network 160 are coupled to each other not through the asynchronous radio network 150.

The asynchronous core network 160 comprises a NAS part 161 connected to that of the asynchronous mobile station 140, a layer 3 164 having a AS part (not shown in FIG. 2B), a layer 2 165 and a layer 1 166 connected respectively to those in the asynchronous radio network 150. The NAS part comprises an asynchronous CC entity 163 for management of a call and an asynchronous MM entity 162 for management of mobility.

Functions of the layer 3 to 1 of the asynchronous system are similar with those of the synchronous system except for an operating type. Therefore, for convenience, detailed description of the layer 3 to 1 will be skipped.

The more detailed descriptions about layered protocol structures are well taught in $3^{rd}$ Generation partnership Project (3GPP), Technical Specification group (TSG)—Radio Access Network (RAN): 3G TS25.301 (Radio Interface Protocol Architecture), 3G TS25.302 (Services provided by the physical layer), 3G TS25.321 (MAS Protocol Specification), 3G TS25.322 (RLC Protocol Specification) and 3G TS25.331 (RRC Protocol Specification) in detail.

In the conventional asynchronous mobile station and radio network having the layered protocol structure, the asynchronous mobile station 140 receives a system information message from the asynchronous radio network 150 over a broadcast control channel (BCCH) and acquires information necessary to its connection to the asynchronous core network 160, including information related to the asynchronous core network 160 and information about the asynchronous radio network 150, from the received system information message.

IMT-2000 systems are the third generation systems which aim to unity the various mobile communication networks and services into one to provide many mobile communication services. The systems can provide multimedia services under multi-environments through various air-interfaces and high capacity. Also, in the aspect of services, the systems can provide multimedia services of speech, image and data up to the rate of 2 Mbps and international roaming. And, in the aspect of network, the systems are total systems which are based on ATM networks and combine fixed and wireless systems.

IMT-2000 system requires new system concept, a high-level adaptation technology, and a novel network technology, as well all conventional technologies which were already adopted in the second digital cellular system.

As described above, in the next-generation mobile telecommunication system such as the IMT-2000 system, either the GSM-MAP network used in the above conventional asynchronous mobile telecommunications system or the ANSI-41 network used in the above conventional synchronous mobile telecommunications system should be employed as a core network in order to perform an international roaming in a synchronous or asynchronous mobile telecommunications system of an IMT02000 system.

According to network deployment scenarios, the IMT-2000 system can have the following four interface architectures; first: synchronous mobile station—synchronous radio network—synchronous ANSI-41 network, second: synchronous mobile station—synchronous radio network—asynchronous GSM-MAP network, third: asynchronous mobile station—asynchronous radio network—synchronous ANSI-41 network, and fourth: asynchronous mobile station—asynchronous radio network—asynchronous GSM-MAP network.

FIG. 3 is a view showing a protocol stack structure for interfacing a mobile station and a base station with a core network in a next-generation mobile telecommunications system.

Referring to FIG. 3, it is illustrated a protocol stack structure for interfacing a mobile station and a base station with a core network having the same or a different operating type with/from the mobile station and the base station in a next-generation mobile telecommunications system such as the IMT-2000 system.

The asynchronous mobile station includes a physical layer, a medium access layer, a radio link layer, a radio resource layer, a mobility management entity and a call control entity. Also, the asynchronous mobile station includes extensions and hooks.

The extension performs a mapping function between the asynchronous mobile station and the synchronous core network. The hook provides environments for performing a mapping function between the asynchronous mobile station and the synchronous core network.

The asynchronous base station includes the same elements with those of the asynchronous mobile station.

Concepts of the protocol stack structure for interfacing a mobile station and a base station and a core network are already defined, however, specific functions the protocol stack structure are not yet defined and proposed.

The conventional synchronous mobile station and radio network have a disadvantage in that the synchronous mobile station cannot be interfaced with any other networks than a synchronous core network connected thereto because synchronous mobile station cannot recognize an asynchronous message from an asynchronous core network, the conventional synchronous mobile station cannot communicate with the asynchronous core network.

Similarly, the conventional asynchronous mobile station and radio network have a disadvantage in that the asynchronous mobile station cannot be interfaced with any other networks than an asynchronous core network because asynchronous mobile station cannot recognize a synchronous message from a synchronous core network, the conventional asynchronous mobile station cannot communicate with the synchronous core network.

SUMMARY OF THE INVENTION

Therefore, it is an object of the invention to provide a method and apparatus for interfacing a synchronous core network with an asynchronous mobile station in a next-generation mobile telecommunication system.

It is another object of the invention to provide a method and apparatus for transmitting a CC/MM entity between a synchronous core network between an asynchronous mobile station in a next-generation mobile telecommunication system.

It is further another object of the invention to provide a method and apparatus for mapping a message transmitted between a synchronous core network and an asynchronous mobile station in a next-generation mobile telecommunication system.

It is still further another object of the invention to provide a method and apparatus for transmitting a message between a synchronous core network to an asynchronous mobile station in a next-generation mobile telecommunication system.

In accordance with an aspect of the preset invention, there is provided a method for mapping a message in order to interface a synchronous core network with an asynchronous radio network a base station (BS), the base station having a radio resource controller, a radio link controller, a medium access controller and a physical controller, the method comprising the steps of: a) selecting a function necessary to map a synchronous message to an asynchronous message; b) determining whether the synchronous message is to be transmitted to the mobile station or not; c) storing information necessary to map the synchronous message to the asynchronous message if the synchronous message it to be transmitted to the mobile station; d) mapping parameters in the synchronous message to those in the asynchronous message, thereby generating the asynchronous message; e) discarding the message not to be transmitted to the mobile station after storing parameters included in the message not to be transmitted onto a predetermined device; and f) transmitting the asynchronous message to the radio resource controller.

In accordance with another aspect of the present invention, there is provided a method for transmitting a message from a synchronous core network to an asynchronous radio network having a base station (BS), the base station having a radio resource controller, a radio link controller, a medium access controller and a physical controller, the method comprising the steps of: receiving a synchronous message from the synchronous core network; and mapping the synchronous message to an asynchronous message based on information from supporting entities placed in the radio resource controller, the radio link controller, the medium access controller and the physical controller.

In accordance with further another aspect of the present invention, there is provided a method for transmitting a message from an asynchronous radio network to a synchronous core network, the radio network having a base station (BS), a mobile station and the base station respectively having a radio resource controller, a radio link controller, a medium access controller and a physical controller, the method comprising the steps of: receiving an asynchronous message; and mapping the asynchronous message to a synchronous message based on information from supporting entities placed in the radio resource controller, the radio link controller, the medium access controller and the physical controller.

In accordance with still further another aspect of the present invention, there is provided a method for transmitting a call control/mobility management (CC/MM) message from a synchronous core network to an asynchronous radio network, the radio network having a mobile station (MS), a base transceiver station (BTS) and a base station controller (BSC), the method comprising the steps of: a) receiving a message received from the synchronous core network, the message having parameters to be bypassed and parameters not to be bypassed; b) determining whether the parameters are to be bypassed or not; c) bypassing the parameters to be bypassed to the mobile station if the parameters are to be bypassed; and
d) processing the parameters not be bypassed and generating a processed message it not.

BRIEF DESCRIPTION OF THE DRAWINGS

The above and other objects and features of the instant invention will become apparent from the following description of preferred embodiments taken in conjunction with the accompanying drawings, in which:

FIG. 3 is a view showing a protocol stack structure for interfacing a mobile station and a base station with a core network in a next-generation mobile telecommunications system;

DETAILED DESCRIPTION OF A PREFERRED EMBODIMENTS OF THE INVENTION

Hereinafter, preferred embodiments of the present invention will be described in detail with reference to the accompanying drawings.

Figure 1A:
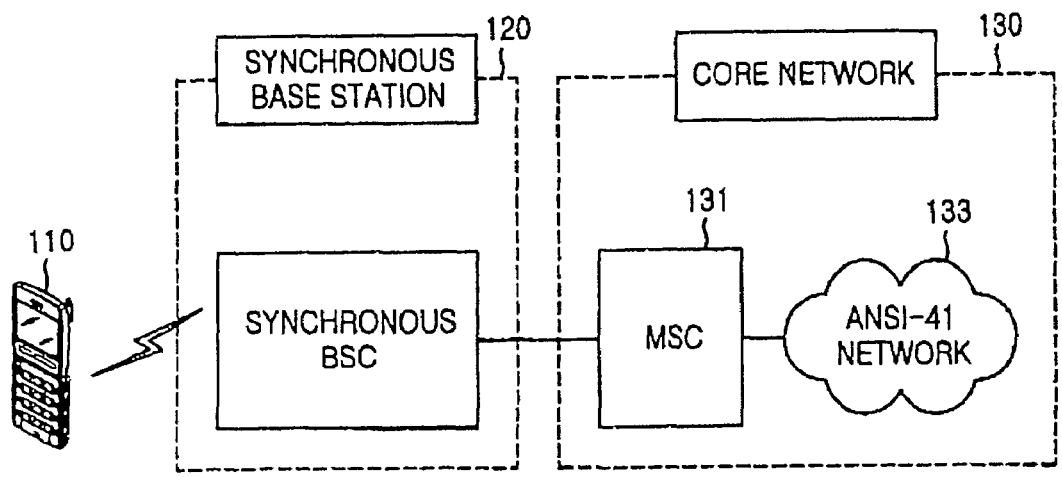
FIG. 1A is a view showing the core network interface architecture of the conventional synchronous mobile telecommunications system.
Figure 1B:
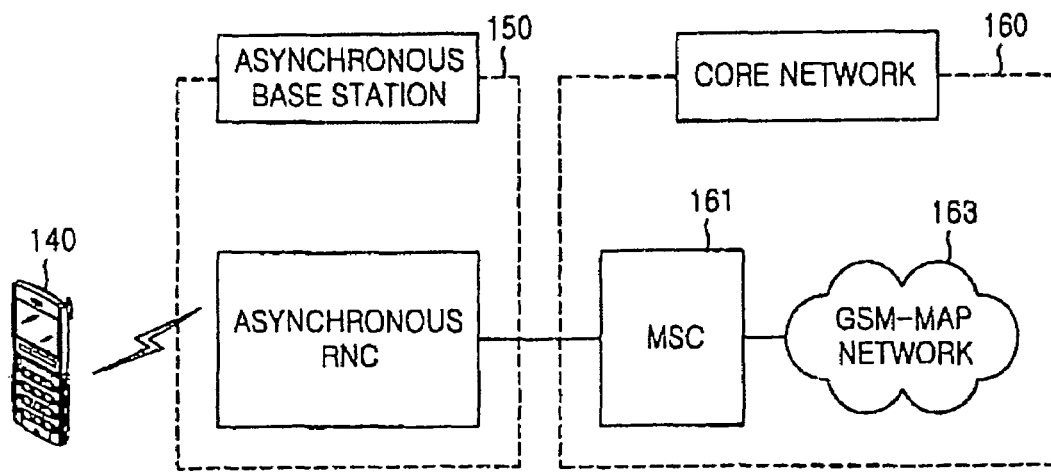
FIG. 1B is a view showing the core network interface architecture of the conventional asynchronous mobile telecommunications system.
Figure 2A:
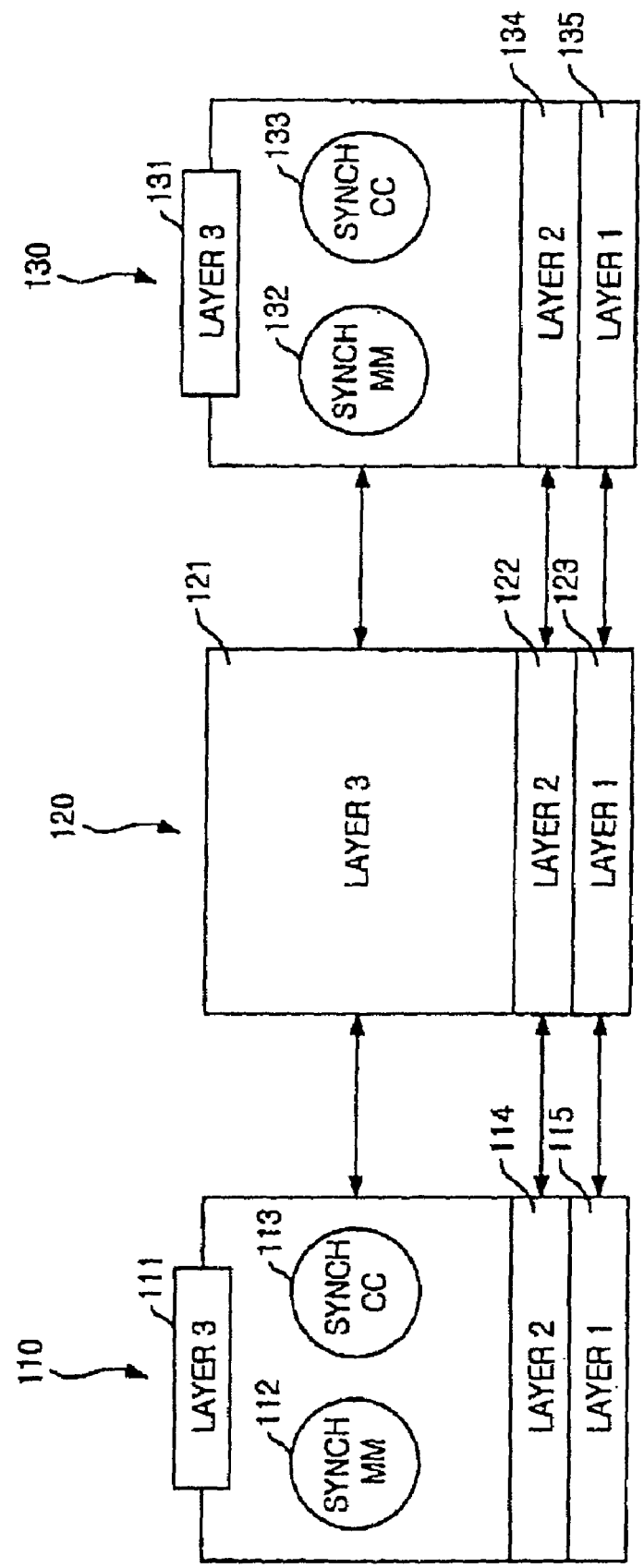
FIG. 2A is a diagram of layer protocols of a conventional synchronous mobile telecommunications system.
Figure 2B:
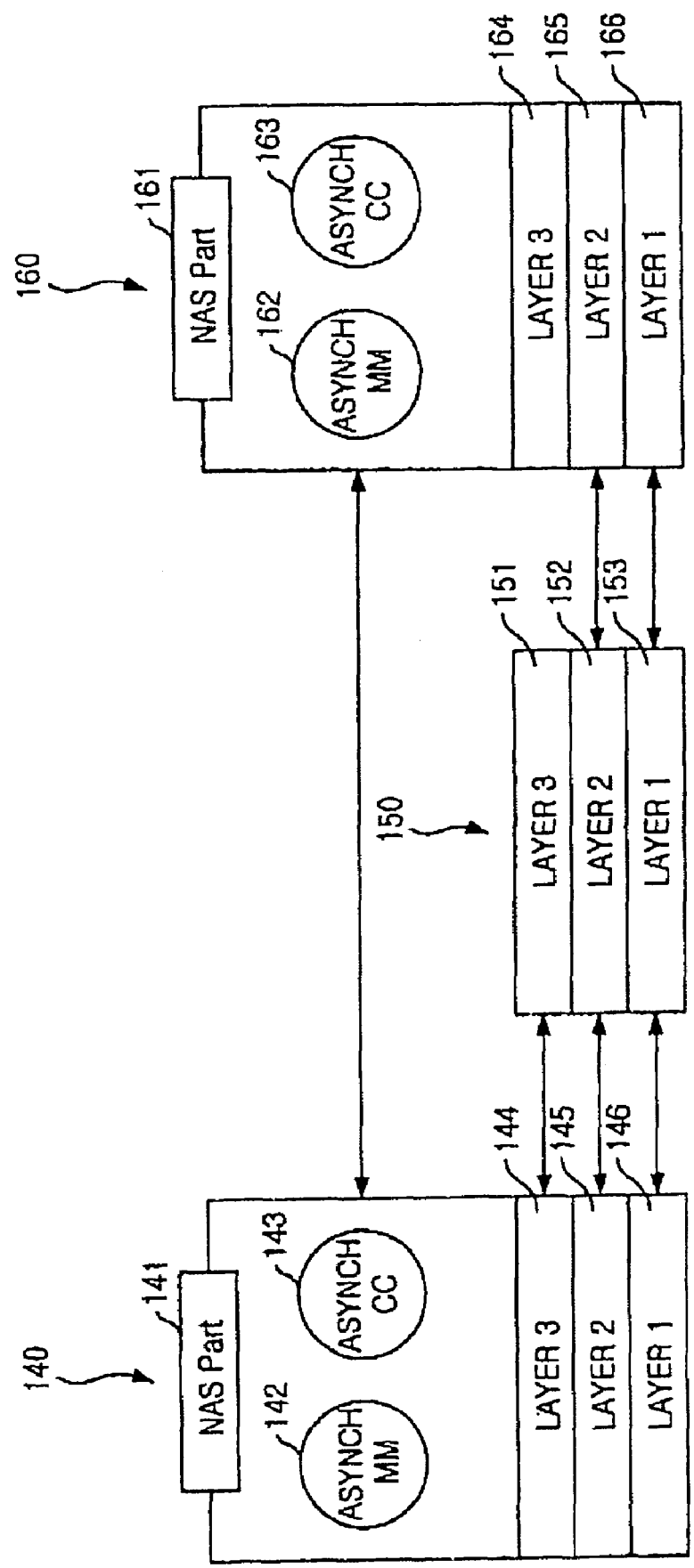
FIG. 2B is a diagram of layer protocols of a conventional asynchronous mobile telecommunications system.
Figure 4:
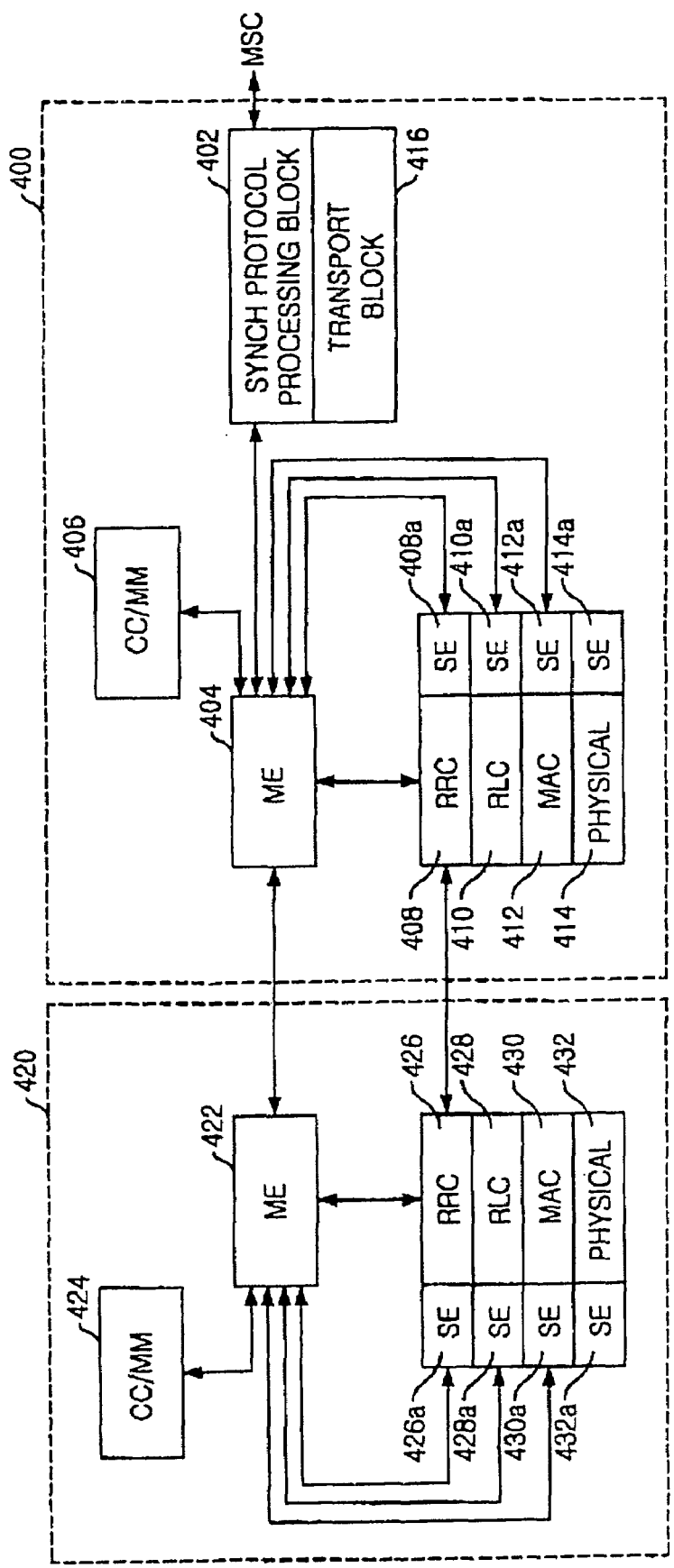
FIG. 4 is a diagram of protocol layers of an asynchronous mobile station and an asynchronous radio network for interfacing with a synchronous core network in accordance with an embodiment of the present invention.

FIG. 4 is a diagram of protocol layers of an asynchronous mobile station and an asynchronous radio network for interfacing the asynchronous radio network with a synchronous core network in accordance with the present invention.

The reference numeral 400 denotes an asynchronous radio network. The base station 400 includes a synchronous protocol processing block 402, a mapping entity 404, a call control/mobility management (CC/MM) entity 406, a radio resource controller 408, a radio link controller 410, a medium access controller 412, a physical layer 414 and a transport block 416.

The radio resource controller 408, the radio link controller 420, the medium access controller 412 and the physical layer 414 respectively include a supporting entity 408a, 410a, 412a, or 414a.

The reference numeral 420 denotes an asynchronous mobile station. The asynchronous mobile station 420 includes a mapping entity 422, a call control/mobility management (CC/MM) entity 424, a radio resource controller 426, a radio link controller 428, a medium access controller 430 and a physical layer 432.

The radio resource controller 426, the radio link controller 428, the medium access controller 430 and the physical layer 432 respectively include a supporting entity 426a, 428a, 430a or 432a.

The supporting entity interfaces the asynchronous radio network with the synchronous core network.

If data is received from the synchronous core network, it is determined whether the data is to be transmitted to the mobile station 420 or not. If the data is to be transmitted to the mobile station, a message mapping or parameter mapping of the data is performed in the mapping entity 404. The mapped data is provided to the radio resource controller 408. The radio resource controller 408 transmits the mapped data to the CC/MM entity 406 of the mobile station 420 by using the radio resource message.

The mapping entity 404 transmits an information request primitive requesting information necessary to map or to generate parameters to the supporting entity 408a in the radio resource controller 408. When receiving the information request primitive, the supporting entity transmits the information requested to the mapping entity 404.

Figure 5A:
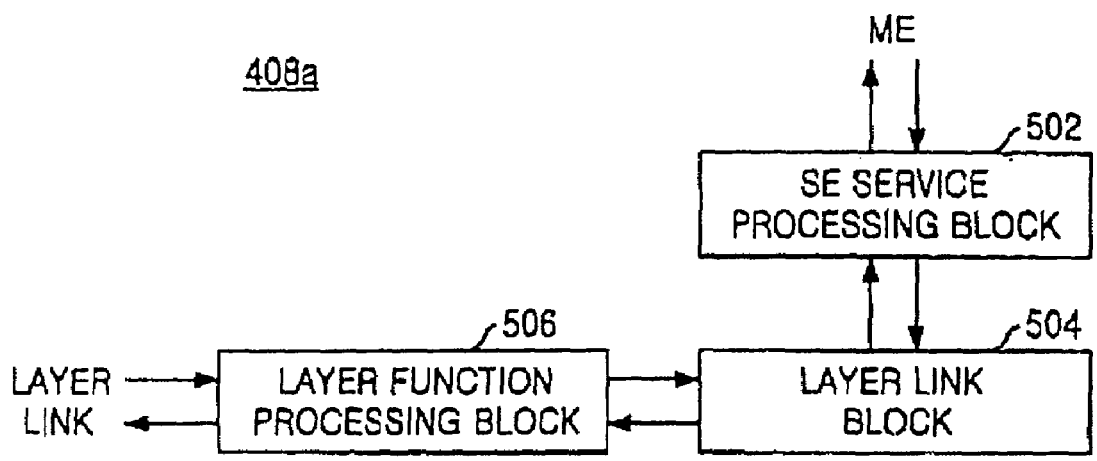
FIG. 5A to 5D are block diagrams of supporting entities in accordance with the preset invention.

Referring to FIG. 5A, the supporting entity 104a includes a SE service processing block 502, a layer link block 504, and a layer function processing block 506.

The SE service processing block 502 provides a communication path for a data communication between the supporting entity and the mapping entity 404. The SE service processing block 502 transmits the information request primitive to the layer link block 504.

The layer link block 504 interfaces the SE service processing block 502 with the layer function processing block 506. In other words, the layer link block 504 maps information related to upper layers with to data having a format used in the layer function processing clock 506.

The layer function processing block 506 controls a radio resource setting and management based on information for the layer link block 504. The layer function processing block 506 obtains information requested by the mapping entity 404 radio resource controller. The information obtained from the radio resource controller is transmitted to the mapping entity 404 through the layer function processing block 506, the layer link block 504 and the SE service processing block 502.

Referring to FIG. 4 again, the radio link controller 410 controls a setting/releasing of a radio link connection based on information from the radio resource controller 408. If the mapping entity 404 requests the supporting entity 410a in the radio link controller 410 to provide information necessary to a parameter mapping or a parameter generation, the supporting entity 410a provides requested information to the mapping entity 404.

Figure 5B:
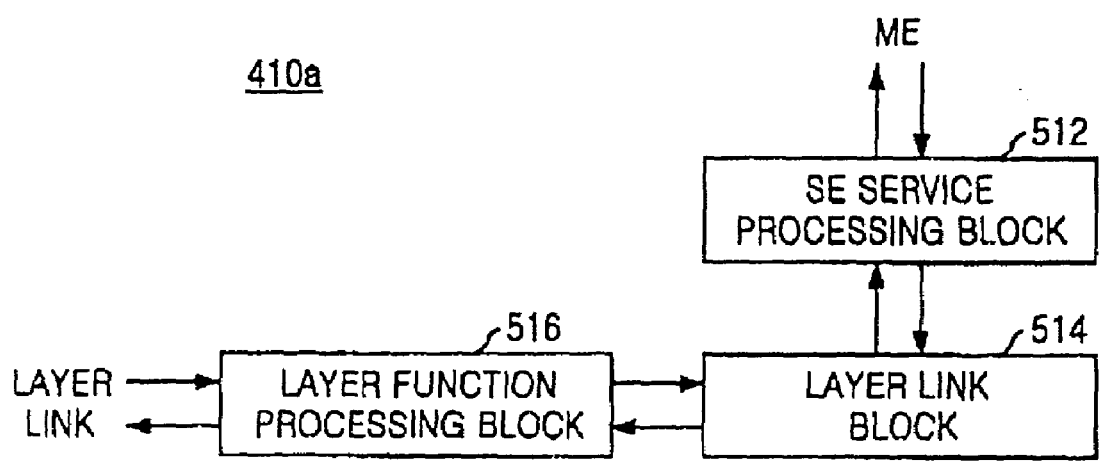

Referring to FIG. 5B, the supporting entity 410a includes a SE service processing block 512, a layer link block 514, and a layer function processing block 516.

The SE service processing block 502 provides a communication path for data communication between the supporting entity and the mapping entity 404. The SE service processing block 512 transmits the information request primitive to the layer link block 514.

The layer link block 514 interfaces the SE service processing block 512 with the layer function processing block 516.

The layer function processing block 516 controls setting/releasing a connection to the radio link controller and data transmission based on information from the layer link block 504. The radio link controller is responsible for data transmission. The layer function processing block 516 obtains information requested by the mapping entity from the radio link controller. The information obtained from the radio link controller is transmitted to the mapping entity through the layer function processing block 516, the layer link block 514 and the SE service processing block 512.

Referring to FIG. 4 again, the medium access controller 106 controls access to a physical medium based on the information obtained from the radio link controller 410. If the mapping entity 404 requests the supporting entity 3412*a* in the medium access controller 412 to provide information necessary to a parameter mapping or a parameter generation, the supporting entity 412*a* provides requested information to the mapping entity 404.

Figure 5C:
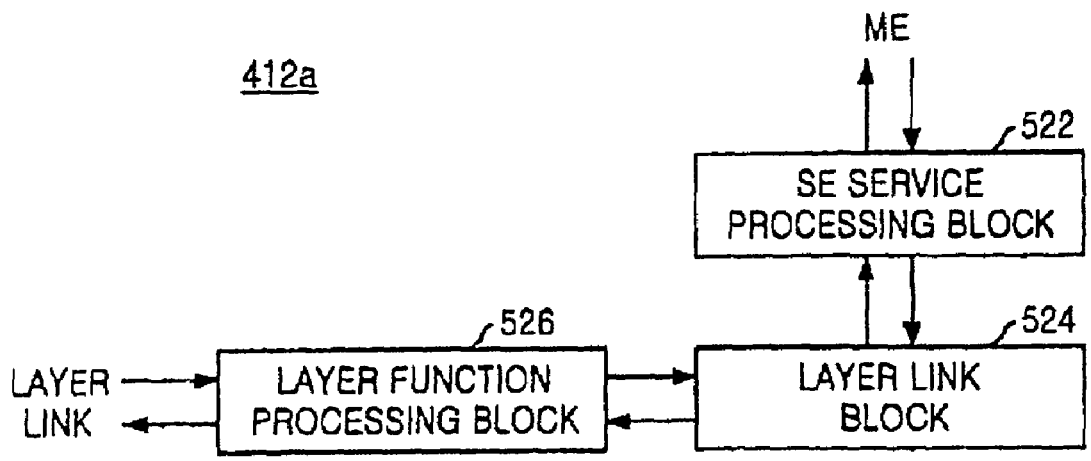

Referring to FIG. 5C, the supporting entity 412*a* includes a SE service processing block 522, a layer link block 524, and a layer function processing block 526.

The SE service processing block 522 provides a communication path for data communication between the supporting entity and the mapping entity 404. The SE service processing block 522 transmits the information request primitive to the layer link block 526.

The layer link block 524 interfaces the SE service processing block 522 with the layer function processing block 526.

The layer function processing block 526 controls reassignment of the radio resource, interfaces the physical layer 414 with the radio resource controller 408. The layer function processing block 526 obtains information requested by the mapping entity from the medium access controller. The information obtained from the medium access controller is transmitted to the mapping entity through the layer function processing block 526, the layer link block 524 and the SE service processing block 522.

Referring to FIG. 4 again, the physical layer 414 controls a connection to a physical medium based on the information obtained from the medium access controller 412. If the mapping entity 404 requests the supporting entity 414*a* in the medium access controller 414 to provide information necessary to a parameter mapping or parameter generation, the supporting entity 414*a* provides requested information to the mapping entity 404.

Figure 5D:
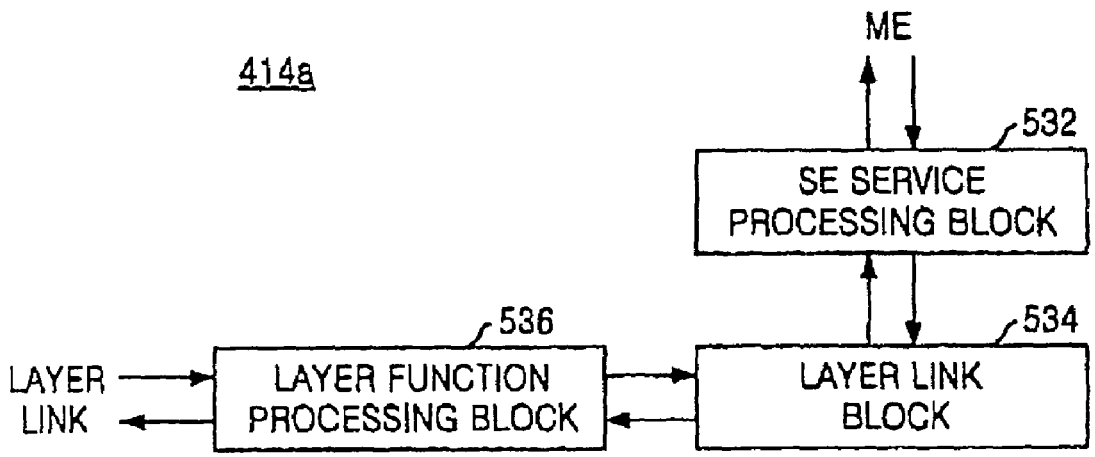

Referring to FIG. 5D, the supporting entity 414*a* includes a SE service processing block 532, a layer link block 534, and a layer function processing block 536.

The SE service processing block 532 provides a communication path for data communication between the supporting entity and the mapping entity 404. The SE service processing block 532 transmits the information request primitive to the layer link block 534.

The layer link block 534 interfaces the SE service processing block 532 with the layer function processing block 536.

The layer function processing block 536 performs a radio interface. The layer function processing block 536 obtains information requested by the mapping entity from the physical layer. The information obtained from the physical layer is transmitted to the mapping entity through the layer function processing block 536, the layer link block 534 and the SE service processing block 532.

The mapping entity 422 in the mobile station 420 receives information from the synchronous core network and transmits information to be transmitted to the synchronous core network through communications message with the mapping entity 404 in the radio access network 400. The mapping entity 422 performs the parameter mapping or the parameter generation with is similar to be performed by the mapping entity 404. Therefore, for convenience, detailed description will be skipped in this specification.

Figure 6:
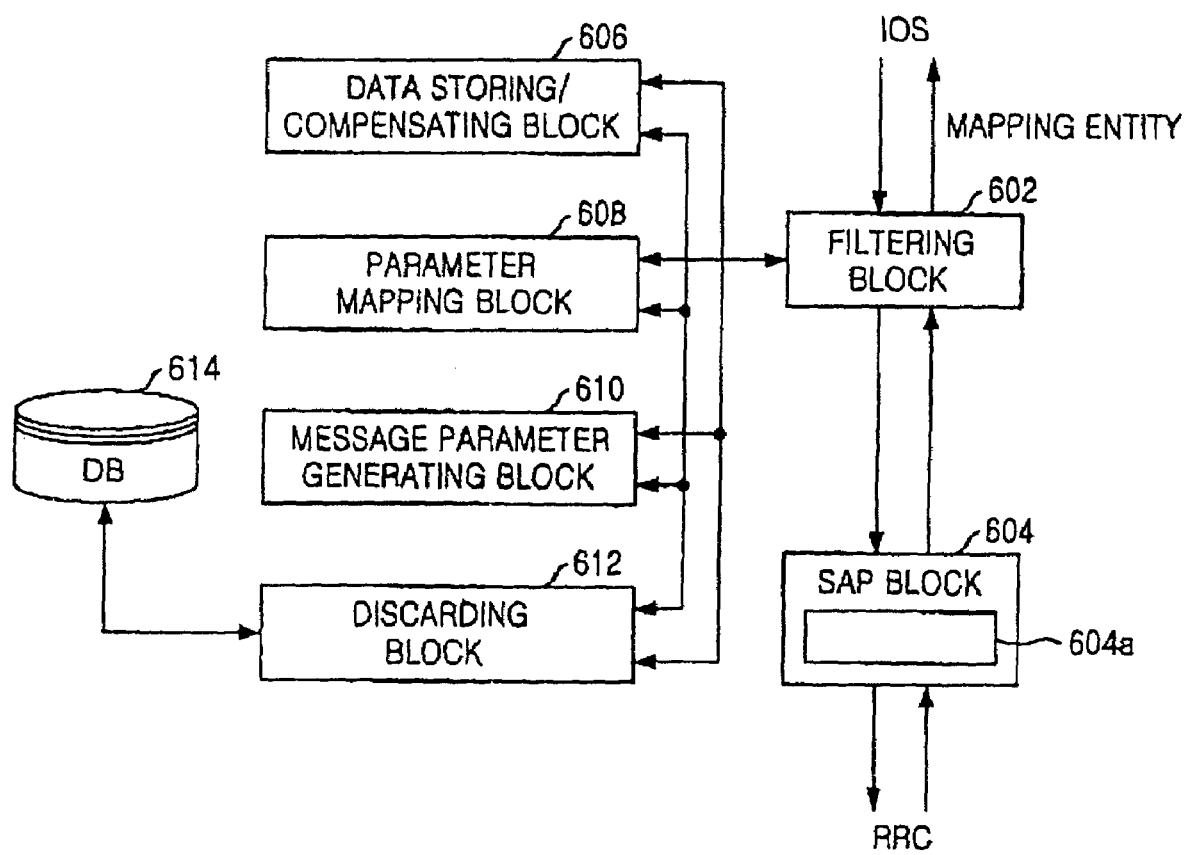
FIG. 6 is a block diagram of a mapping entity in accordance with the preset invention.

FIG. 6 is a block diagram of a mapping entity in accordance with an embodiment of the present invention.

The mapping entity 404 includes a filtering block 602, a service access point (SAP) block 604, a data storing/compensating block 606, a parameter mapping block 608, a message/parameter generating block 610 and a discarding block 612.

The filtering block 602 selects a function necessary to generate or to map messages received from the asynchronous radio network or the asynchronous mobile station.

The data storing/compensating block 606, if necessary, stores information necessary to generate or to map the message/parameter and corrects stored message/parameter.

The parameter mapping block 608 is coupled to the filtering block 602. The parameter mapping block 608 maps the parameters of the messages received from the filtering block 602 into parameters of messages from the asynchronous radio network, if the message is transmitted from the synchronous core network to the asynchronous mobile station. The parameter mapping block 608 maps the parameters of the messages received from the filtering block 602 into parameters of messages for the synchronous core network, if the message is transmitted from the asynchronous mobile station to the synchronous core network. Then, the mapped data is transmitted to the filtering block 602.

The message/parameter generating block 610 generates messages and parameters to be transmitted to the asynchronous radio network or the synchronous core network based on the data stored onto the data storing/compensating block 606.

In other words, the message/parameter generating block 610 generates a new message or parameter if there is no related parameter in the message to be transmitted to the asynchronous mobile station or the synchronous core network. In similar, the message/parameter generating block 610 generates a new message or parameter if there is no related parameter in the message to be transmitted to the synchronous core network.

The discarding block 612 discards the message/parameter not to be transmitted to the asynchronous radio network in the message/parameters received from the filtering block 602. The discarding block 612 allows information included in the received parameter to be stored on a database 614 and corrects the information stored on the database 614. The discarding block 612 discards the message/parameter not to be transmitted to the asynchronous mobile station in the message/parameters received from the filtering block 602. The discarding block 612 allows information included in the received parameters to be stored on a database 614 and corrects the information stored on the database 614.

The filtering block 602 transmits the message or parameter which is used for the filtering block 602 or to be transmitted to the asynchronous mobile station 420 to the SAP block 604. The message or the parameter transmitted top the SAP block 604 is a message or a parameter which is mapped or generated in the parameter mapping block 608, the message/parameter generating block 610 or the discarding block 612.

The SAP block provides a patch for a data transmission between the filtering block 602 and the radio resource controller. The SAP block 604 manages an asynchronous service access point function.

When transmitting the message/parameter to the lower layers, if possible, the message/parameter is transmitted to the radio resources controller by the RRC SAP block. If there is a function which is not defined in the RRC SAP block, the message/parameter is transmitted to the radio resource controller by a supporting entity (SE) SAP function of the supporting entity 604a.

Then, the RRC transfers the received message to its lower layers, or transmits the received message to the CC/MM 424 of the asynchronous mobile station 420 by using a RRC message.

The mapping entity 422 included in the asynchronous mobile station has elements and functions similar to those of the asynchronous radio network. Therefore, for convenience, detailed description about the mapping entity 422 will be skipped in the specification.

Figure 7:
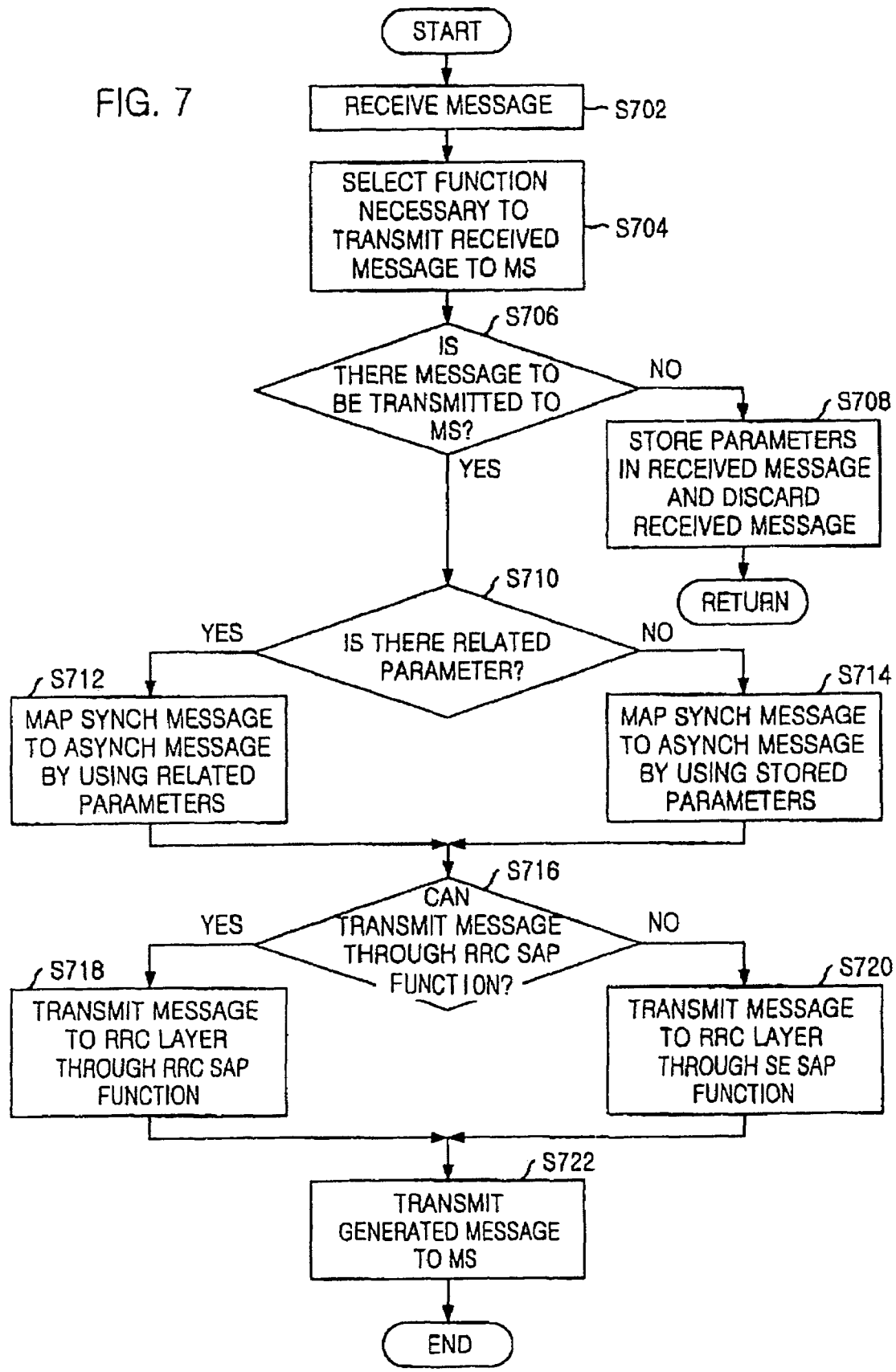
FIG. 7 is a flow chart illustrating a method for transmitting a message between an asynchronous radio network and a synchronous core network.

FIG. 7 is a flow chart illustrating a method for transmitting a message between an asynchronous radio network and a synchronous core network.

First, a message is received from a synchronous core network in step S702. The process goes to step S704 to select a function necessary to transmit the received message to the asynchronous mobile station. In other words, one of a message mapping function, a message/parameter generating function, a message/parameter storing function, or a message parameter discarding function is selected.

At step S706, it is determined whether there is a message to be transmitted to the asynchronous mobile station. If there is no message to be transmitted to the asynchronous mobile station, the parameters included in the message are stored onto the database 614 and the message is discarded at step S708.

If there is a message to be transmitted to the asynchronous mobile station, it is determined whether there is a related parameter in the received message at step S710.

If there is the related parameter in the received message, the parameter for the synchronous message is mapped to a parameter for the asynchronous message at step 712.

If there is no related parameter, a parameter for the asynchronous message is generated by using the stored parameter at step 714.

Then, it is determined whether the mapped or generated message an be transmitted by using a conventional RRC SAP function at step S716. If possible, the message is transmitted to the RRC by using the conventional RRC SAP function at step S718. If not, the message is transmitted to the RRC by using the supporting entity (SE) SAP function at step S720.

The RRC transmits the generated message to the CC/MM entity of the asynchronous mobile station by using the RRC message at step S722.

Figure 8:
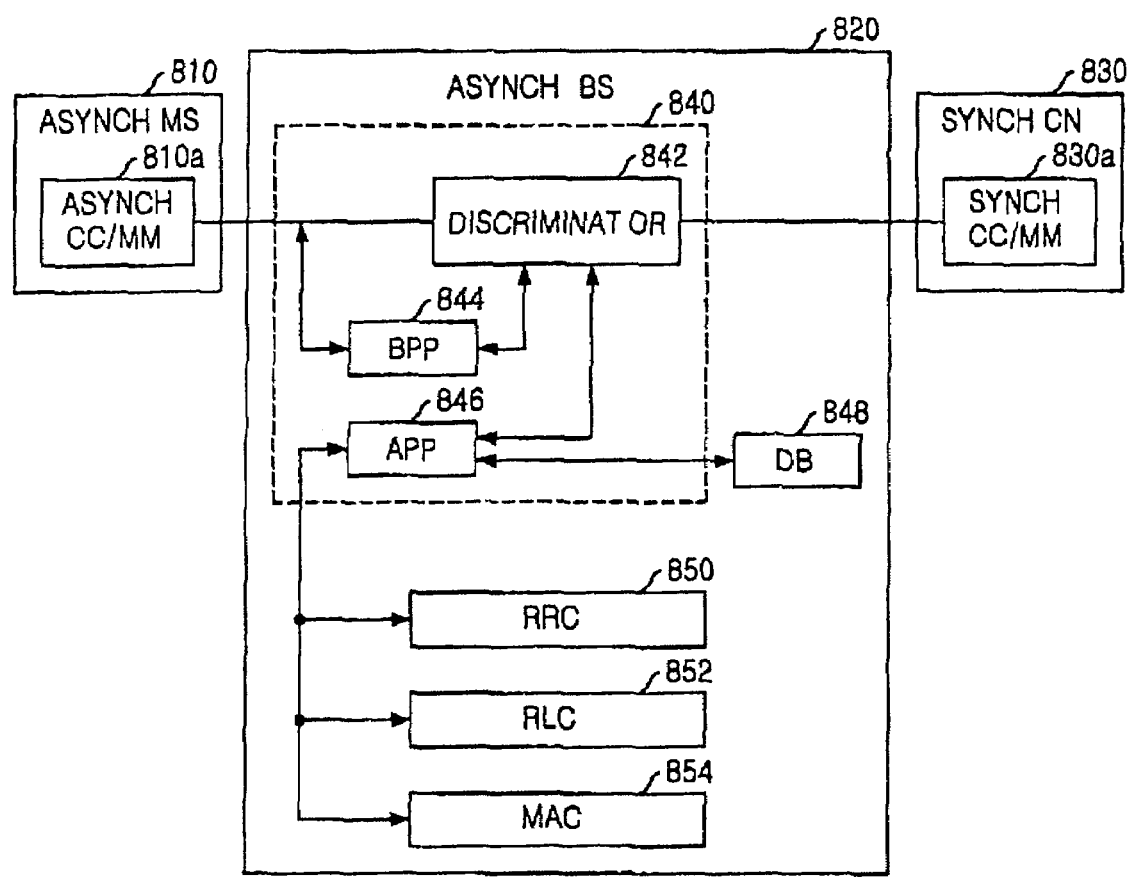
FIG. 8 is a block diagram of a device for mapping a call control/mobile management (CC/MM) message between an asynchronous radio network and a synchronous core network in accordance with another embodiment of the present invention.

FIG. 8 is a block diagram of a CC/MM mapper for mapping a call control/mobile management (CC/MM) message between an asynchronous radio network and a synchronous core network.

Hereinafter, a method and apparatus for interfacing a synchronous core network with a radio network in accordance with another embodiment of the preset invention will be described with reference to FIGS. 8 to 12.

The CC/MM mapper includes a discriminator 842 a bypass parameter processing block (BPP) 844 and an action parameter processing block (APP) 846.

The discriminator 840 monitors a CC/MM message and divides the message into parameters to by bypassed and parameters not to be bypassed.

The BPP 844 encapsulates the parameter to be bypassed or maps the parameter in accordance with a message format used in the radio resource controller of the asynchronous radio network. Then, the BPP 844 transmits encapsulated or mapped parameter to the asynchronous mobile station.

The APP 846 stores onto the database 848 or transmits information to be processed in the asynchronous radio network to lower protocol layers, i.e., the radio resource controller 850, the radio link controller 852 and the medium access controller 854.

Figure 9:
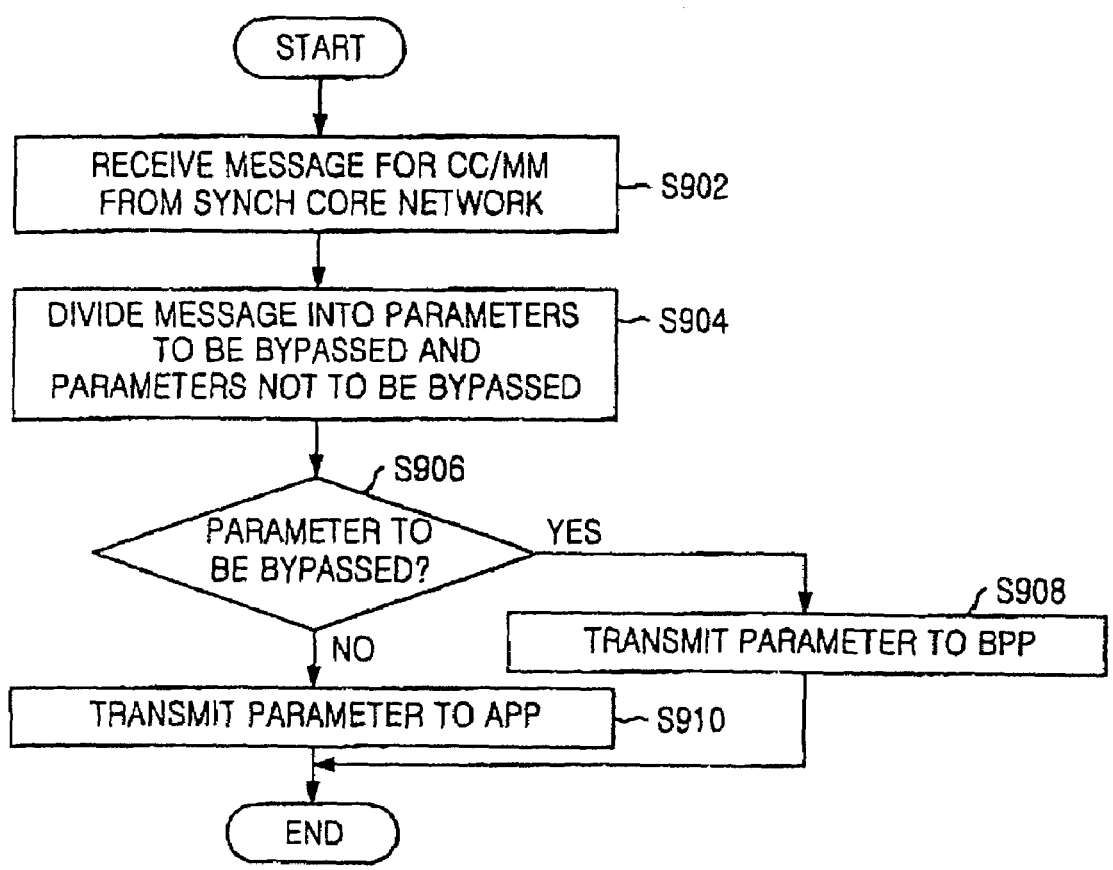
FIG. 9 is a flow chart illustrating a method for determining whether the CC/MM message is bypassed or not.

FIG. 9 is a flow chart illustrating a method for determining whether the CC/MM message is bypassed or not.

First, a message for CC/MM is received from the synchronous core network at step S902. The discriminator divides the message into parameters to be bypassed and parameters not to be bypassed at step S904. Then, it is determined whether the parameter is to be bypassed or not at step S906. If the message is to be bypassed, the message is transmitted to the BPP 844 at step S908. If not, the message is transmitted to the APP 846 at step S910.

Figure 10:
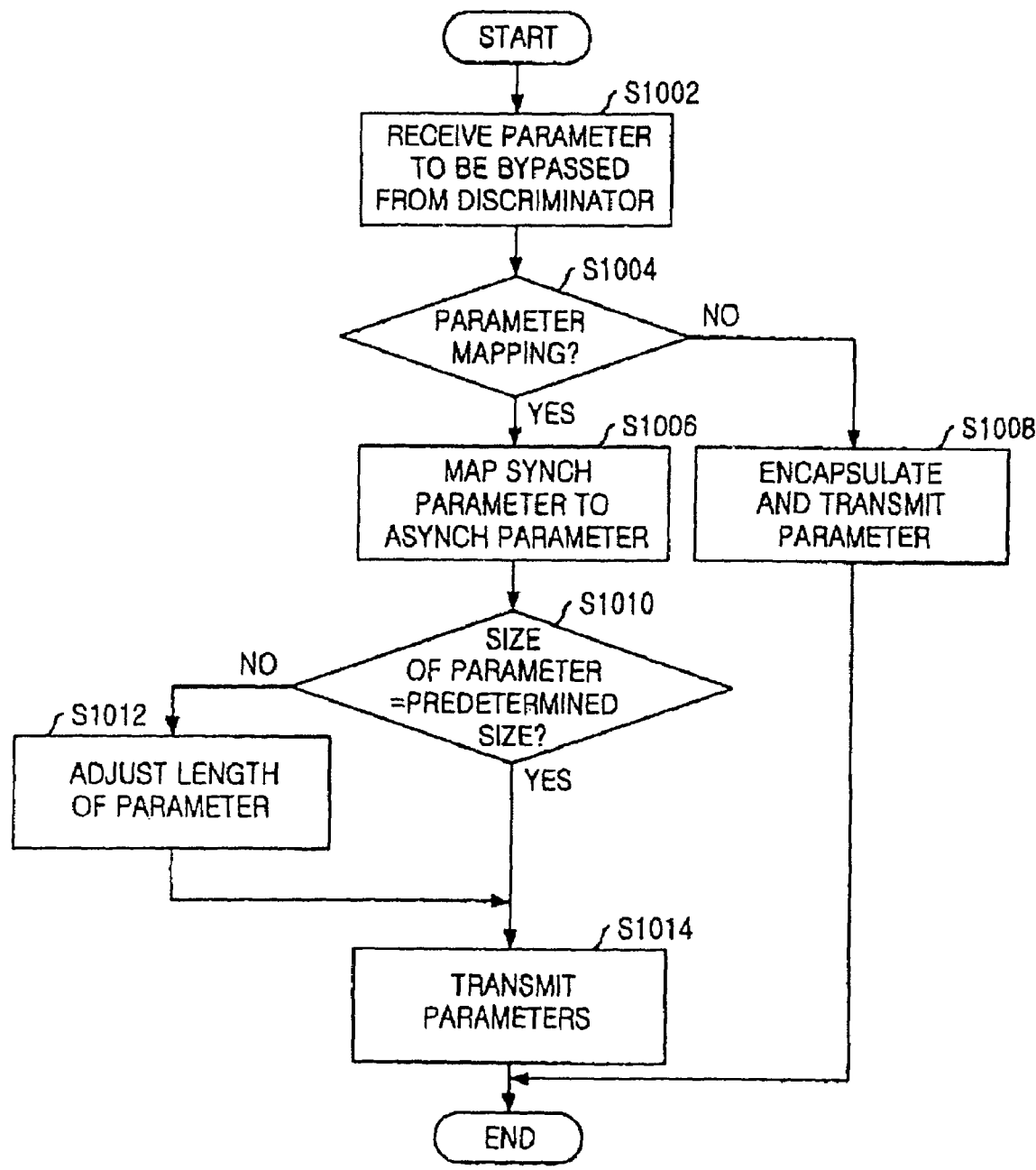
FIG. 10 is a flow chart illustrating a method for mapping synchronous CC/MM message to asynchronous CC/MM message.

FIG. 10 is a flow chart illustrating a method for mapping synchronous CC/MM message to asynchronous CC/MM message.

The BPP 844 receives a message to be bypassed from the discriminator at step S1002, and determines whether the message can be converted by a mapping or an encapsulation at step S1004. If the message cannot be converted by the mapping method, in other words, if the message can be converted by the encapsulating method, the BPP 844 encapsulates the message in accordance with the data format of the asynchronous radio resource controller and bypasses an encapsulated message to the asynchronous mobile station at step S1008.

If the message should be converted by the mapping method, the BPP 844 maps the synchronous parameter into an asynchronous parameter and determines whether a size of the mapped parameter is equal to a predetermined size at steps S1006 and S1010. If the size of the mapped parameter is equal to the predetermined size, the BPP 844 arranges the mapped parameters in the order of the synchronous message and transmits the mapped parameter to the asynchronous mobile station at step S1014. If not, the BPP 844 adjusts a length of the mapped parameter in accordance with the predetermined size at step S1012. Then, the BPP 844 arranges the parameters in the order of the asynchronous message and transmits the parameter having the same length with the predetermined size at steps S1012 and S1014.

Figure 11:
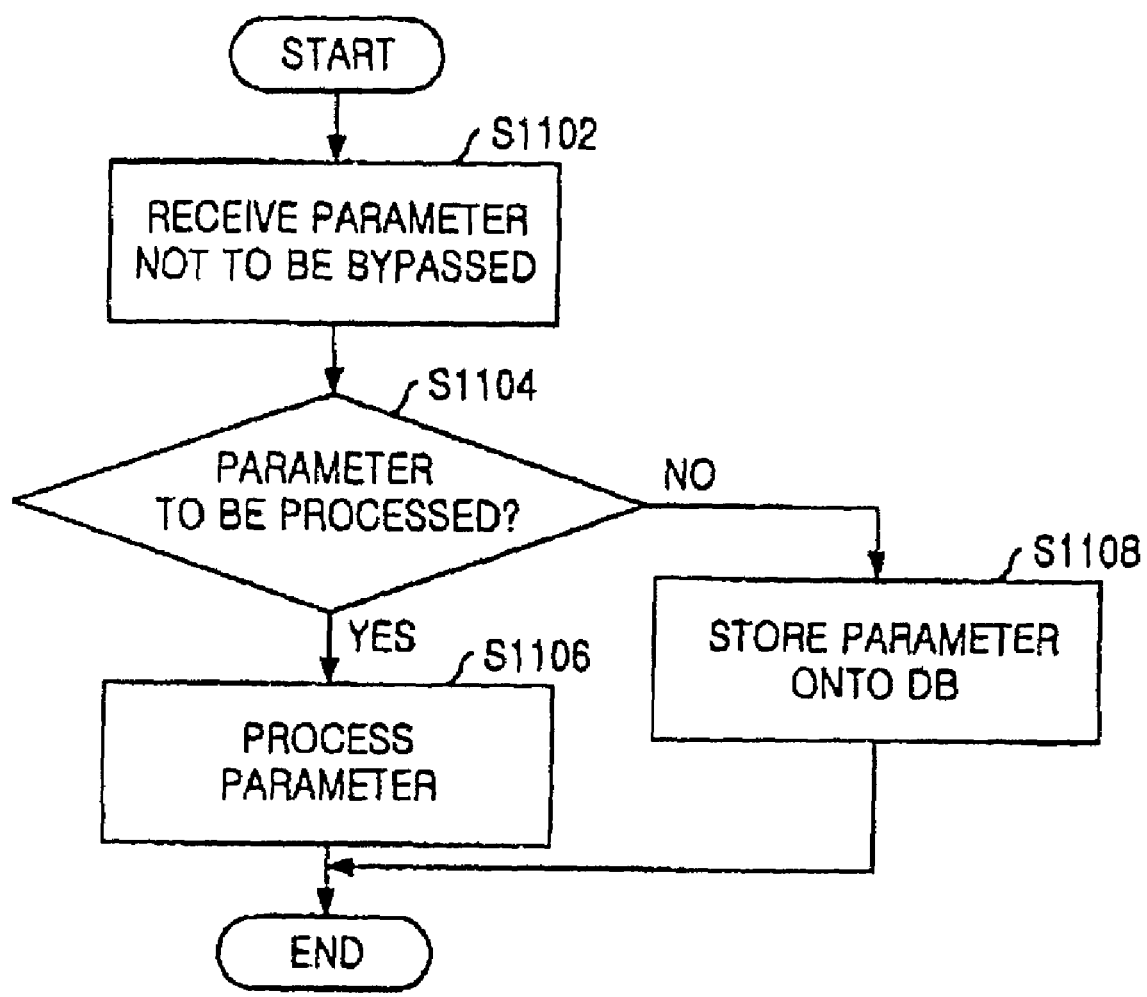
FIG. 11 is a flow chart illustrating a method for processing information used the radio network.

FIG. 11 is a flow chart illustrating a method for processing a parameter not to be bypassed.

The APP 846 receives a parameter not to be bypassed, i.e., a parameter used in the asynchronous radio network at step S1102, and determines whether the parameter of the message is to be processed at step S1104.

If the parameter is to be processed, the APP processes the parameters at step S1106. If not, the APP stores the message onto the database at step 1108.

Figure 12:
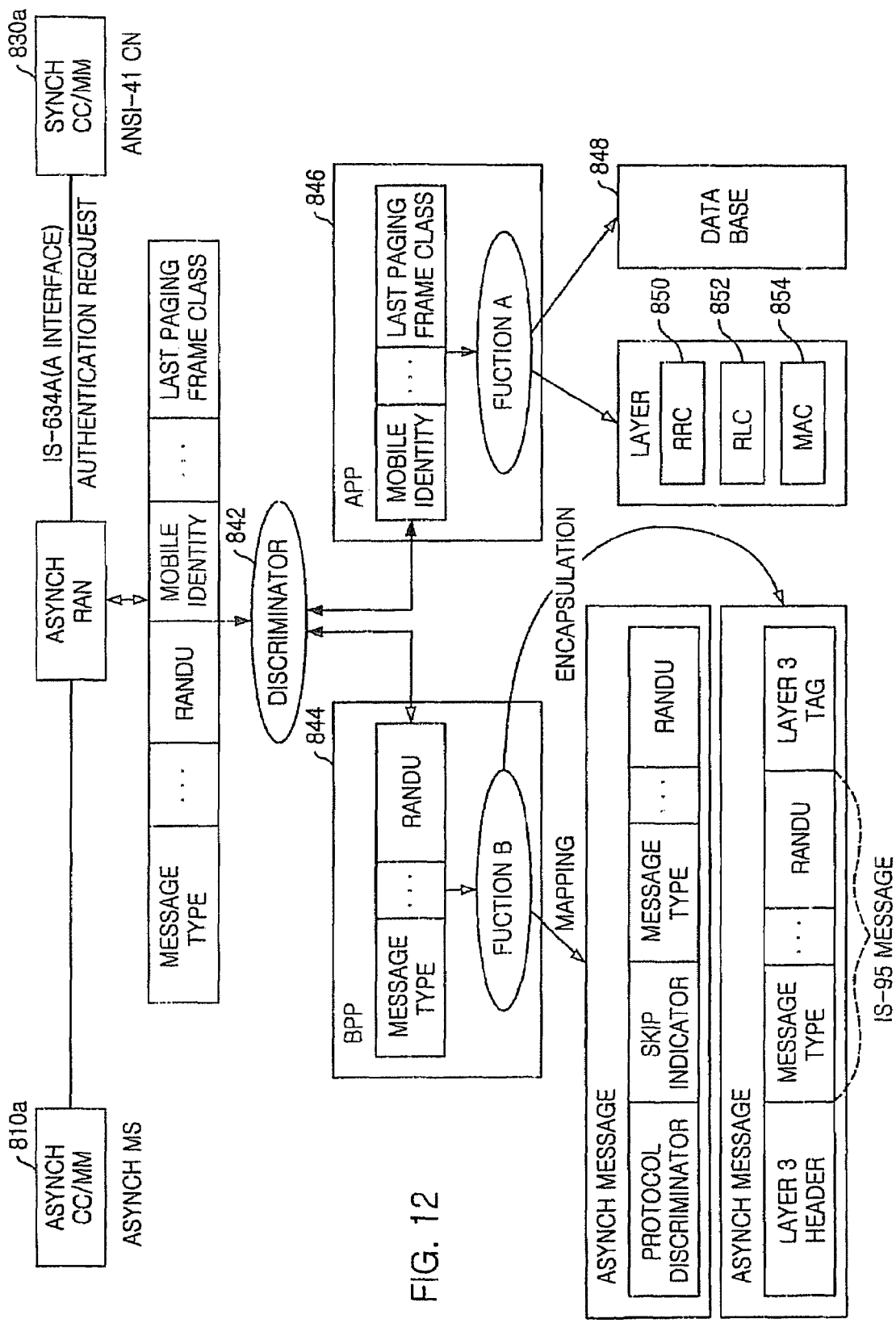
FIG. 12 is a diagram showing operations for converting synchronous authentication request message to asynchronous message.

FIG. 12 is a diagram showing operations for converting synchronous authentication request message to asynchronous authentication request message.

If an authentication request message is received at a synchronous CC/MM entity 830a included in a synchronous core network, a call processing block 840 of an asynchronous base station determines whether the authentication request message should be bypassed or not in order to be transmitted to an asynchronous CC/MM entity 810*a* in a asynchronous mobile station.

The discriminator 842 divides the authentication request message into parameters to be bypassed and parameters to be processed in the asynchronous base station. For example, parameters to be processed in the asynchronous base station include a mobility identity, a last paging frame class, etc. the parameters to be bypassed include a message type, an authentication challenge parameter, etc.

The parameters to be bypassed are transmitted to the BPP 844. The parameters to be processed in the asynchronous base station are transmitted to the APP 846.

The BPP 844 receives the message to be bypassed from the discriminator and determines whether the message can be converted by a mapping or an encapsulating method. If the message cannot be converted by the mapping method, in other words, if the message should be converted by the encapsulating method, the BPP 844 encapsulates the parameter in accordance with the data format of the asynchronous radio resource controller and bypasses the encapsulated parameter to the asynchronous mobile station.

If the parameter should be converted by the mapping method, the BPP 844 maps the synchronous parameter into an asynchronous parameter and determines whether a size of the mapped parameter is equal to a predetermined size. If the size of the mapped parameter is equal to the predetermined size, the BPP transmits the mapped parameter to the asynchronous mobile station. If not, the BPP 844 adjusts a length of the mapped parameter in accordance with the predetermined size by using padding. The BPP 844 bypasses the parameter having the same length with the predetermined size in order to transmit the parameter.

If the APP 846 receives a message not to be bypassed, i.e., the parameter used in the asynchronous base station, and determines whether the parameter is to be processed in a lower layer, for example, RRC, RLC or MAC. If the parameter is to be processed in lower layer, the APP 846 allows the parameter to be processed in the lower layer, for example, RRC, RLC or MAC.

If the parameters of the message are to be reused, the APP 846 stores the message onto the database. When a response message to the authentication request message is received from the asynchronous mobile station, the asynchronous base station transmits the response message to the synchronous core network based on the stored parameters.

Although the preferred embodiments of the invention have been disclosed for illustrative purpose, those skilled in the art will be appreciate the various modifications, additions and substitutions are possible, without departing from the scope and spirit of the invention as disclosed in the accompanying claims.

We claim:

1. A method for transmitting a call control/mobility management (CC/MM) message from a synchronous core network to an asynchronous radio network, the radio network having a mobile station (MS), a base transceiver station (BTS), and a base station controller (BSC), the method comprising the steps of:
   a) receiving a message received from the synchronous core network, the message having parameters to be bypassed and parameters not to be bypassed;
   b) determining whether the parameters are to be bypasses or not;
   c) bypassing the parameters to be bypassed to the mobile station if the parameters are to be bypassed by:
      c1) determining whether the parameter to be bypassed can be processed by a parameter mapping or not;
      c2) mapping the parameter which is a synchronous parameter to an asynchronous parameter;
      c3) determining whether a size of the asynchronous parameter is equal to that of the synchronous parameter or not;
      c4) if the size of the asynchronous parameter is equal to that of the synchronous parameter, arranging the asynchronous parameters in order of the synchronous parameter and generating a bypass data; and
      c5) transmitting the bypass data to the mobile station; and
   d) processing the parameters not to be bypassed and generating a processed message if not.

2. The method as recited in claim 1, further comprising the step of:
   e) transmitting the processed message.

3. The method as recited in claim 1, further including the steps of:
   c6) if the parameter to be bypassed can not be processed by a parameter mapping, encapsulating the parameter to be bypassed in accordance with a data format of the radio resource controller and generating an encapsulation data; and
   c7) transmitting the encapsulation data to the mobile station.

4. The method as recited in claim 1, wherein the step d) includes:
   d1) determining whether the parameter not to be bypassed should be processed or not;
   d2) if the parameter not to be bypassed should be processed, processing the parameter not to be bypassed; and
   d3) if not, storing the parameter not to be bypassed.

5. An apparatus for transmitting a call control/mobility management (CC/MM) message from a synchronous core network to an asynchronous radio network, the radio network having a mobile station (MS), a base transceiver station (BTS), and a base station controller (BSC), the apparatus comprising:
   means for receiving a message received from the synchronous core network, the message having parameters to be bypassed and parameters not to be bypassed;
   means for determining whether the parameters are to be bypassed or not;
   means for bypassing the parameters to be bypassed to the mobile station if the parameters are to be bypassed, wherein said means for bypassing includes:
      means for determining whether the parameter to be bypassed can be processed by a parameter mapping or not;
      means for mapping the parameter which is a synchronous parameter to an asynchronous parameter;
      means for determining whether a size of the asynchronous parameter is equal to that of the synchronous parameter or not;
      means for arranging the asynchronous parameters in order of the synchronous parameter and generating a bypass data if the size of the asynchronous parameter is equal to that of the synchronous parameter; and
      means for transmitting the bypass data to the mobile station; and
   means for processing the parameters not to be bypassed and generating a processed message if not.

6. The apparatus as recited in claim 5, further comprising means for transmitting the processed message.

7. The method as recited in claim 5, further including the steps of:
- means for if the parameter to be bypassed can not be processed by a parameter mapping, encapsulating the parameter to be bypassed by a parameter mapping, encapsulating the parameter to be bypassed in accordance with a data format of the radio resource controller and generating an encapsulation data; and
- means for transmitting the encapsulation data to the mobile station.

8. The method as recited in claim 5, wherein the means for processing includes:
- means for determining whether the parameter not to be bypassed should be processed or not;
- means for processing the parameter not to be bypassed if the parameter not to be bypassed should be processed; and
- means for storing the parameter not to be bypassed if not.

9. A base station for transmitting a call control/mobility management (CC/MM) message from a synchronous core network to an asynchronous radio network, the radio network having a mobile station (MS), a base transceiver station (BTS), and a base station controller (BSC), the base station comprising:
- means for receiving a message received from the synchronous core network, the message having parameters to be bypassed and paramaters not to be bypassed;
- means for determining whether the parameters are to be bypassed or not;
- means for bypassing the parameters to be bypassed to the mobile station if the parameters are to be bypassed, wherein said means for bypassing includes:
  - means for determining whether the parameter to be bypassed can be processed by a parameter mapping or not;
  - means for mapping the parameter which is a synchronous parameter to an asynchronous parameter;
  - means for determining whether a size of the asynchronous parameter is equal to that of the synchronous parameter or not;
  - means for arranging the asynchronous parameters in order of the synchronous parameter and generating a bypass data if the size of the asynchronous parameter is equal to that of the synchronous parameter; and
  - means for transmitting the bypass data to the mobile station; and
- means for processing the parameters not to be bypassed and generating a processed message if not.

10. The base station as recited in claim 9, further comprising means for transmitting the processed message.

11. The base station as recited in claim 9, further including the steps of:
- means for if the parameter to be bypassed can not be processed by a parameter mapping, encapsulating the parameter to be bypassed in accordance with a data format of the radio resource controller and generating an encapsulation data; and
- means for transmitting the encapsulation data to the mobile station.

12. The method as recited in claim 9, wherein the means for processing includes:
- means for determining whether the parameter not to be bypassed should be processed or not;
- means for processing the parameter not to be bypassed if the parameter not to be bypassed should be processed; and
- means for storing the parameter not to be bypassed if not.

* * * * *